(12) United States Patent
Woo et al.

(10) Patent No.: US 10,304,248 B2
(45) Date of Patent: May 28, 2019

(54) APPARATUS AND METHOD FOR PROVIDING AUGMENTED REALITY INTERACTION SERVICE

(71) Applicant: KOREA ADVANCED INSTITUTE OF SCIENCE AND TECHNOLOGY, Daejeon (KR)

(72) Inventors: Woon Tack Woo, Daejeon (KR); Tae Jin Ha, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 168 days.

(21) Appl. No.: 15/322,075

(22) PCT Filed: Jun. 26, 2015

(86) PCT No.: PCT/KR2015/006591
§ 371 (c)(1),
(2) Date: Dec. 23, 2016

(87) PCT Pub. No.: WO2015/199502
PCT Pub. Date: Dec. 30, 2015

(65) Prior Publication Data
US 2017/0154471 A1    Jun. 1, 2017

(30) Foreign Application Priority Data

Jun. 26, 2014  (KR) .................. 10-2014-0079107
Jan. 16, 2015  (KR) .................. 10-2015-0008083
Jun. 26, 2015  (KR) .................. 10-2015-0091330

(51) Int. Cl.
*G06K 9/34*    (2006.01)
*G06T 19/00*   (2011.01)
(Continued)

(52) U.S. Cl.
CPC ............ *G06T 19/006* (2013.01); *G06F 3/011* (2013.01); *G06F 3/017* (2013.01);
(Continued)

(58) Field of Classification Search
CPC ......... G06T 19/006; G06T 7/11; G06T 7/593; G06T 7/12; G06T 7/149; G06T 7/75;
(Continued)

(56) References Cited

U.S. PATENT DOCUMENTS

2008/0181459 A1* 7/2008 Martin ............... G06K 9/00355
382/103
2013/0057469 A1* 3/2013 Ajika ..................... G06F 3/017
345/156

(Continued)

FOREIGN PATENT DOCUMENTS

KR   10-0980202 B1     9/2010
KR   10-2011-0113948 A  10/2011
(Continued)

OTHER PUBLICATIONS

Izadi et al., "KinectFusion: Real-time 3D Reconstruction and Interaction Using a Moving Depth Camera", Oct. 2011, ACM, Proceedings of the 24th annual ACM symposium on User interface software and technology, p. 559-568.*
(Continued)

*Primary Examiner* — Vincent Rudolph
*Assistant Examiner* — Timothy Choi

(57) ABSTRACT

Provided is a method of providing an augmented reality interaction service, the method including: generating reference coordinates based on a 3-dimensional (3D) image including depth information obtained through a camera; segmenting a region corresponding to a pre-set object from the 3D image including the depth information obtained through the camera, based on depth information of the
(Continued)

pre-set object and color space conversion; segmenting a sub-object having a motion component from the pre-set object in the segmented region, and detecting a feature point by modeling the sub-object and a palm region linked to the sub-object based on a pre-set algorithm; and controlling a 3D object for use of an augmented reality service by estimating a posture of the sub-object based on joint information of the pre-set object provided through a certain user interface (UI).

15 Claims, 16 Drawing Sheets

(51) Int. Cl.
| | | |
|---|---|---|
| *G06T 7/11* | (2017.01) | |
| *G06T 7/73* | (2017.01) | |
| *G06T 7/593* | (2017.01) | |
| *G06F 3/01* | (2006.01) | |
| *G06K 9/00* | (2006.01) | |
| *G06K 9/52* | (2006.01) | |
| *G06K 9/62* | (2006.01) | |
| *G06F 3/0484* | (2013.01) | |
| *G06T 7/12* | (2017.01) | |
| *G06T 7/149* | (2017.01) | |

(52) U.S. Cl.
CPC ..... *G06F 3/04842* (2013.01); *G06K 9/00355* (2013.01); *G06K 9/52* (2013.01); *G06K 9/6202* (2013.01); *G06K 9/6215* (2013.01); *G06T 7/11* (2017.01); *G06T 7/12* (2017.01); *G06T 7/149* (2017.01); *G06T 7/593* (2017.01); *G06T 7/75* (2017.01); *G06K 9/00671* (2013.01); *G06K 9/34* (2013.01); *G06T 2207/10024* (2013.01); *G06T 2207/10028* (2013.01); *G06T 2207/20036* (2013.01); *G06T 2207/20104* (2013.01); *G06T 2207/30196* (2013.01)

(58) Field of Classification Search
CPC . G06T 2207/10028; G06T 2207/20104; G06T 2207/10024; G06T 2207/20036; G06K 9/6215; G06K 9/52; G06K 9/00355; G06K 9/6202; G06K 9/00671; G06F 3/011; G06F 3/017; G06F 3/04842
See application file for complete search history.

(56) References Cited

U.S. PATENT DOCUMENTS

| | | | | |
|---|---|---|---|---|
| 2013/0222427 | A1* | 8/2013 | Heo | G06F 3/011 |
| | | | | 345/633 |
| 2014/0177955 | A1* | 6/2014 | Srinivasan | G06K 9/4652 |
| | | | | 382/165 |
| 2015/0242683 | A1* | 8/2015 | Tang | G06K 9/00389 |
| | | | | 382/173 |
| 2016/0004907 | A1* | 1/2016 | Lundberg | G06K 9/48 |
| | | | | 348/53 |

FOREIGN PATENT DOCUMENTS

| | | |
|---|---|---|
| KR | 10-2012-0046607 A | 5/2012 |
| KR | 10-2013-0099317 A | 9/2013 |
| KR | 10-2014-0001167 A | 1/2014 |
| KR | 10-2014-0028064 A | 3/2014 |
| WO | WO 2012/170359 A2 | 12/2012 |

OTHER PUBLICATIONS

Oikonomidis et al., "Efficient Model-based 3D Tracking of Hand Articulations using Kinect", Sep. 2011, BMVA Press, Proceedings of the British Machine Vision Conference, p. 1-11.*
Lee et al., "Handy AR: Markerless Inspection of Augmented Reality Objects Using Fingertip Tracking", Oct. 2007, IEEE, 11th IEEE International Symposium on Wearable Computers, p. 1-8.*
Oka et al., "Real-time Tracking of Multiple Fingertips and Gesture Recognition for Augmented Desk Interface Systems", May 2002, IEEE, Proceedings of Fifth IEEE International Conference on Automatic Face Gesture Recognition, p. 1-6.*
Cobos et al., "Efficient Human Hand Kinematics for Manipulation Tasks", Sep. 2008, IEEE, IEEE/RSJ International Conference on Intelligent Robots and Systems, p. 2246-2251.*
Fioraio et al., "Joint Detection, Tracking and Mapping by Semantic Bundle Adjustment", Oct. 2013, IEEE, IEEE Conference on Computer Vision and Pattern Recognition, p. 1538-1545.*
Micire et al., "Hand and Finger Registration for Multi-Touch Joysticks on Software-Based Operator Control Units", Apr. 2011, IEEE, IEEE Conference on Technologies for Practical Robot Applications, p. 88-93.*
Machine translation for KR 10-2014-0001167, submitted in the IDS dated Dec. 23, 2016.*
Machine translation for KR 10-2013-0099317, submitted in the IDS dated Dec. 23, 2016.*
Machine translation for KR 10-2012-0046607, submitted in the IDS dated Dec. 23, 2016.*
International Search Report for International Patent Application No. PCT/KR2015/006591 filed Jun. 26, 2015.
Taejin Ha et al., "Geometry-aware-based Coordinates Alignment for Wearable Augmented Reality Authoring", Jul. 16, 2014, pp. 57-58.
Taejin Ha et al., "AR Authoring" Dec. 12, 2014, pp. 1-25.

* cited by examiner

APPARATUS AND METHOD FOR PROVIDING AUGMENTED REALITY INTERACTION SERVICE

CROSS-REFERENCE TO RELATED APPLICATIONS

The present application is a U.S. National Stage of International Patent Application No. PCT/KR2015/006591 filed Jun. 26, 2015, which claims priority to and the benefit of Korean Patent Application Nos. 10-2014-0079107 filed Jun. 26, 2014, 10-2015-0008083 filed Jan. 16, 2015, and 10-2015-0091330 filed Jun. 26, 2015, the entire contents of which are incorporated herein by reference.

TECHNICAL FIELD

The present invention relates to a technology supporting a hand interaction with an augmented virtual object in an RGB-D camera-attached head-mounted display (HMD)-based wearable environment, based on geometric recognition-based matching coordinates calibration using an RGB-D camera for authoring a wearable augmented reality.

BACKGROUND ART

In order to prepare an augmented reality space with respect to a real space that is not pre-modeled, a user has to obtain image feature-camera position information about the real space by using a camera, generate local reference coordinates (or matching coordinates), and then match coordinates of a virtual space based thereon. However, since the matching coordinates are generated in an arbitrary location, the user has to manually calibrate a position of the matching coordinates.

Also, through a calibration process of accurately matching a scale between a real space and an augmented reality space, a modeled 3-dimensional (3D) virtual object may be accurately augmented in the augmented reality space in units of the real space, for example, in units of meters (m).

As examples of an existing matching method, a global positioning system (GPS)/compass sensor-based matching method has very low matching precision due to an error in sensor information, and a 2-dimensional (2D) object-based matching method requires a pre-learned image and is not suitable to arbitrary 3D space matching because a matching target is restricted to a 2D plane having a simple shape.

In 3D space-based matching, a user needs to manually calibrate a coordinates position because matching coordinates for augmentation is generated at an arbitrary location. In order to perform such calibration, the user needs expert knowledge related to computer vision/graphics, and if the user performs an inaccurate input, a matching error may be generated due to the inaccurate input.

Also, as an example of a general augmented reality system, KR 10-0980202 discloses a mobile augmented reality system for interaction with 3D virtual objects and a method thereof. The mobile augmented reality system includes a camera attached to a terminal, an image processor generating a 3D virtual object on a hand by using the camera of the terminal, a display unit outputting an image of the 3D virtual object and an image of the hand, and an interaction unit controlling the 3D virtual object correspondingly to movement of the hand, thereby enabling a user to access 3D virtual content anywhere at any time by using a mobile device. As such, KR 10-0980202 is related to a technology for accessing 3D virtual content by using a mobile device, and does not disclose details about automatically generating and calibrating matching coordinates for matching a virtual space.

Accordingly, there is an increasing necessity for a method of automatically generating and calibrating matching coordinates for matching a virtual space.

Meanwhile, nowadays, studies of an interaction technology with tangible content, in which a digital technology, and culture and arts are converged, are receiving a lot of attention. In particular, according to development of augmented reality technologies based on computer graphics and computer vision technologies, there have been attempts to combine virtual digital content to a real world. Also, according to weight lightening and miniaturization of a camera and a head-mounted display (HMD), a wearable computing technology is accelerating. From among various user interface (UI) technologies that are being currently studied, a hand is attracting attention as a natural technology for a wearable computing technology.

There are various general interface technologies for obtaining digital information with respect to an object, a space, and a situation, which interest a user. Examples of a device for such an interface include desktop-based interfaces, such as a mouse, a keyboard, and a remote controller. Such interface technologies may be used to control digital technologies shown on a 2D screen. However, since the interface technologies aim for 2D display, the interface technologies are limited in terms of spaces.

A real space we are living in is a 3D space. When an existing interface for 2D display is used in the real space, a dimension of a space is decreased by 1 and thus the existing interface is restricted.

Accordingly, a 3D interface technology is required to process virtual digital content combined to a 3D space.

Unlike an existing display in a desktop environment, a camera-attached HMD provides a first person environment to a user.

However, in such a camera environment, studies of estimating a finger posture of a bare hand have following problems.

First, a hand is an object having 26 high-dimensional parameters (palm: 6 DOF and 5 fingers: 45=20 DOF). A large computation amount is required in order to estimate a posture of a finger having high dimension.

Second, a hand is an object without texture. Thus, an algorithm of detecting/tracking a feature point-based object from color information is unable to be applied to estimate a finger posture. As such, operations of detecting/tracking a hand and estimating a posture of a finger based on a camera have challengeable conditions.

A WearTrack system is a wearable system using an HMD to which a sensor capable of posture estimation is attached, and a segment magnetic tracker. Systems, such as a virtual touch screen system, AR-Memo, and SixthSense perform 2D interaction based on 2D image coordinates. However, since such systems perform 2D-based interaction, the systems are unable to perform interaction in a 3D space.

Tinmith and FingARtips estimate a posture of a hand by attaching an additional marker to a glove. However, since a size of a segment sensor is too large, Tinmith and FingARtips are not suitable for a user in a wearable environment.

A feature point-based approaching method has also been developed. Such a method estimates a movement of a finger by recognizing a pattern through prior learning. Here, an RGB-D camera, such as Kinect, is fixed to look at a hand of a user, and movement of the hand wearing a glove having a certain pattern is estimated. In the feature point-based approaching method, an additional glove is required to recognize a posture of a finger of the user.

A digits system uses a fingertip tracking method suitable to a wearable device. A depth sensor using a time-of-flight (TOF) method is worn on a wrist and is set such that a self-covering phenomenon of a finger is not generated. According to the digits system, fingers are simply distinguished from each other by using a carving technique, and postures of the fingers are estimated by using relationships between finger joints. However, a sensor needs to be attached to an additional body part, such as a wrist, in addition to an HMD.

DETAILED DESCRIPTION OF THE INVENTION

Technical Problem

One or more embodiments of the present invention are about estimating a posture of a finger of a bare hand, wherein the posture of the finger is estimated when the finger bends towards a camera.

Also, one or more embodiments of the present invention provide a method and apparatus for calibrating geometric recognition-based matching coordinates for authoring wearable augmented reality, whereby matching coordinates for matching a virtual space are automatically generated/calibrated based on an actual survey.

Technical Solution

According to an aspect of the present invention, there is provided a method of providing an augmented reality interaction service, the method including: generating reference coordinates based on a 3-dimensional (3D) image including depth information obtained through a camera; segmenting a region corresponding to a pre-set object from the 3D image including the depth information obtained through the camera, based on depth information of the pre-set object and color space conversion; segmenting a sub-object having a motion component from the pre-set object in the segmented region, and detecting a feature point by modeling the sub-object and a palm region linked to the sub-object based on a pre-set algorithm; and controlling a 3D object for use of an augmented reality service by estimating a posture of the sub-object based on joint information of the pre-set object provided through a certain user interface (UI).

According to another aspect of the present invention, there is provided an apparatus for providing an augmented reality interaction service, the apparatus including: a matching coordinates calibration unit configured to generate reference coordinates based on a 3-dimensional (3D) image including depth information obtained through a camera; an object segmentation unit configured to segment a region corresponding to a pre-set object from the 3D image including the depth information obtained through the camera, based on depth information of the pre-set object and color space conversion; an object processor configured to segment a sub-object having a motion component from the pre-set object in the segmented region, and detect a feature point by modeling the sub-object and a palm region linked to the sub-object based on a pre-set algorithm; and a controller configured to control a 3D object for use of an augmented reality service by estimating a posture of the sub-object based on joint information of the pre-set object provided through a certain user interface (UI).

Advantageous Effects

According to the present invention, since there is no covering between fingers and a fingertip is always shown to a camera, a large self-covering is not generated and thus a posture of finger having a high degree of freedom of complexity may be estimated in real-time.

Also, according to the present invention, by automatically generating/calibrating matching coordinates for matching a virtual space based on an actual survey, the matching coordinates may be automatically generated and calibrated without a user having to perform a calibration operation.

As such, since the matching coordinates may be automatically calibrated, the present invention may be used as a base technology required for authoring augmented reality content in various fields, such as augmented reality-based art galleries/museums, class rooms, industries, and interior designs.

MODE OF THE INVENTION

While the present invention will be described in conjunction with exemplary embodiments thereof, it is to be understood that the present description is not intended to limit the present invention to those exemplary embodiments. On the contrary, the present invention is intended to cover not only the exemplary embodiments, but also various alternatives, modifications, equivalents and other embodiments that may be included within the spirit and scope of the present invention as defined by the appended claims.

The present invention relates to providing of an augmented reality interaction service, and more particularly, to providing of a technology that not only enables a user to use various types of 3-dimensional (3D) content but also provides an interface to a developer to effectively control an object in a 3D space by, with respect to authoring of a wearable augmented reality, automatically generating/calibrating, based on an actual survey, matching coordinates for matching a virtual space by using information obtained by an RGB-D camera, detecting a feature point by modeling a finger having a motion component and a palm region linked to the finger through a pre-set algorithm after segmenting a hand object from a 3D image including depth information based on depth information of a pre-set object and color space conversion so as to estimate a posture of the pre-set object for interaction with a virtual object in an augmented reality, and controlling a 3D object for use of an augmented reality service by estimating a posture of a sub-object based on frame information of the pre-set object, which is provided through a certain user interface (UI).

Also, according to the present invention, by automatically generating/calibrating matching coordinates for matching a virtual space based on an actual survey, the matching coordinates may be automatically generated and calibrated without a user having to perform a calibration operation, and in addition, a base technology required for authoring augmented reality content in various fields, such as augmented reality-based art galleries/museums, class rooms, industries, and interior designs, may be provided.

Hereinafter, a method of providing an augmented reality interaction service, according to an embodiment of the present invention, will be described with reference to FIGS. 1 through 8.

Figure 1:
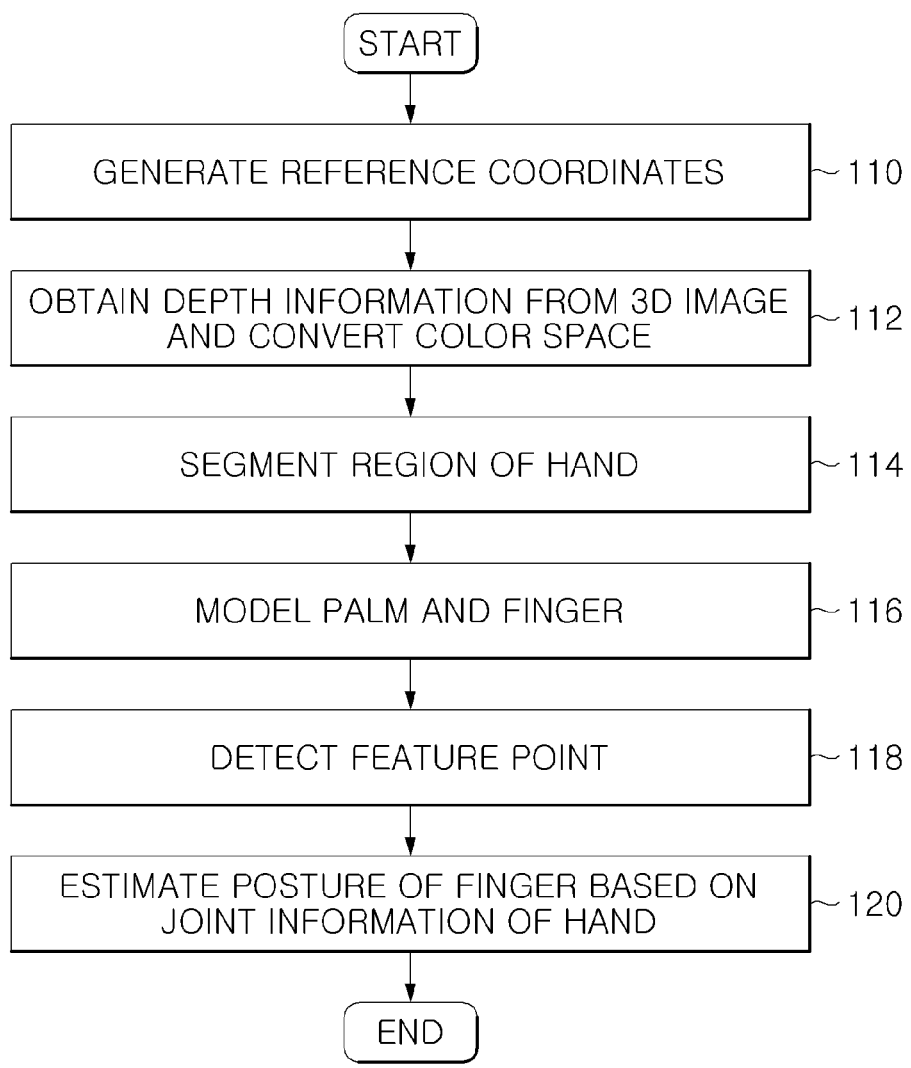
FIG. 1 is a whole flowchart of a method of providing an augmented reality interaction service, according to an embodiment of the present invention.

FIG. 1 is a whole flowchart of a method of providing an augmented reality interaction service, according to an embodiment of the present invention.

Referring to FIG. 1, first, reference coordinates is generated based on a 3D image including depth information obtained through a camera, in operation 110.

Operation 110 is performed through generation of matching coordinates with respect to a real space by analyzing a geometric structure of the real space by using depth image information obtained with respect to the real space, and is an interface for calibrating geometric recognition-based matching coordinates for authoring an RGB-D camera-based wearing (for example, head-mounted display (HMD)) augmented reality, and supported by the present invention so as to further satisfactorily perform posture estimation of an object for interaction with a virtual object in an augmented reality described later.

Then, in operation 112, depth information and a color space of a pre-set object are converted from the 3D image including the depth information obtained from the camera, and a region corresponding to the pre-set object is segmented in operation 114 based on the depth information and color space conversion.

Here, the pre-set object denotes a hand object, and according to an embodiment of the present invention, the hand object is segmented from each of an RGB image and a depth image through operations 112 and 114.

In detail, with respect to an effect of light, for strong skin region segmentation, an RGB color space is converted to an HSV color space from an RGB image, and a corresponding skin color space is obtained by performing a double threshold with respect to saturation and value components.

Also, a distance from a depth image to a distance (arm length) from a hand to camera attached to an HDM is set as a threshold.

A region of a hand may be easily and satisfactorily segmented based on an intersection of results of depth segmentation and RGB segmentation. For example, the threshold may be set to 60 cm, and the segmented depth image and a color image may be aligned by using well-known calibration.

In operation 116, a sub-object having a motion component is segmented from the object in the segmented region, and in operation 118, a feature point is detected by modeling the segmented sub-object and a palm region linked to the sub-object based on a pre-set algorithm. Here, the feature point includes an end point of hand based on a base point and depth information of a finger, wherein the end point of the hand is extracted from a pre-modeled depth template by using template matching.

Such operations are performed so as to segment a palm and a finger in order to estimate a posture of the finger corresponding to the sub-object from an image of the segmented hand, and at this time, the finger and the palm are segmented in the image of the hand by using a morphological operation.

Figure 2:
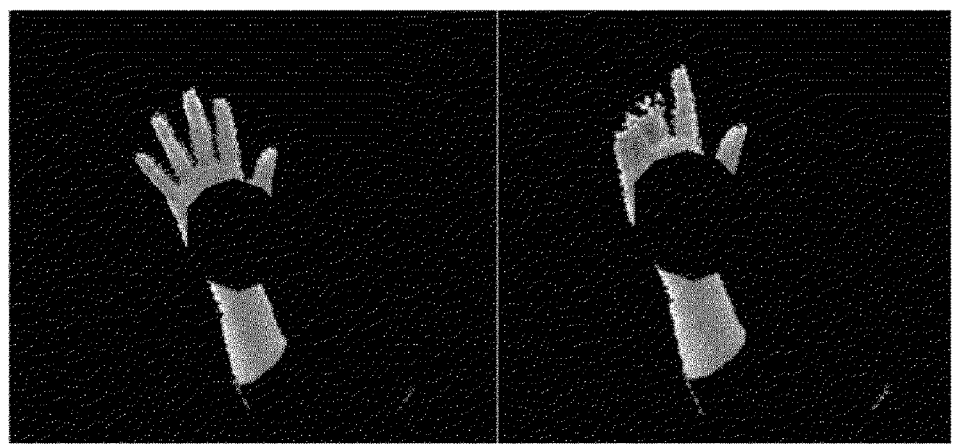
FIG. 2 illustrates an example of a screen to which a visual distance recognition improvement method of a user is applied during bare hand interaction in a head-mounted display (HMD)-based augmented reality environment, according to an embodiment of the present invention.

Here, the morphological operation segments the finger and the palm by using erosion and dilation, wherein the erosion is an operation of eroding an image from the outside and the dilation is an operation of expanding the image unlike the erosion. As shown in FIG. 2, when the erosion is repeatedly performed, a region of a finger gradually disappears. Then, by performing dilation, expansion is performed as much as an area of the palm, thereby modeling a region of the palm. A center of the palm is calculated through distance transform, and the calculated center may be a basis for searching for a base point of the finger.

Also, the finger is modeled together with the palm in operation 116, wherein the finger is modeled via ellipse fitting. As in Equation 1 below, the minimum distance from among distances between points of a modeled ellipse (finger) and the center of the palm is estimated as the base point of the finger. Accordingly, the base point of the finger may be satisfactorily found even when the finger is somewhat bent.

$$\text{base point}(x,y,z) = \min(|\overline{\text{finger}(x,y,z)} - \overline{\text{centerofpalm}(x,y,z)}|) \quad \text{[Equation 1]}$$

Figure 5:
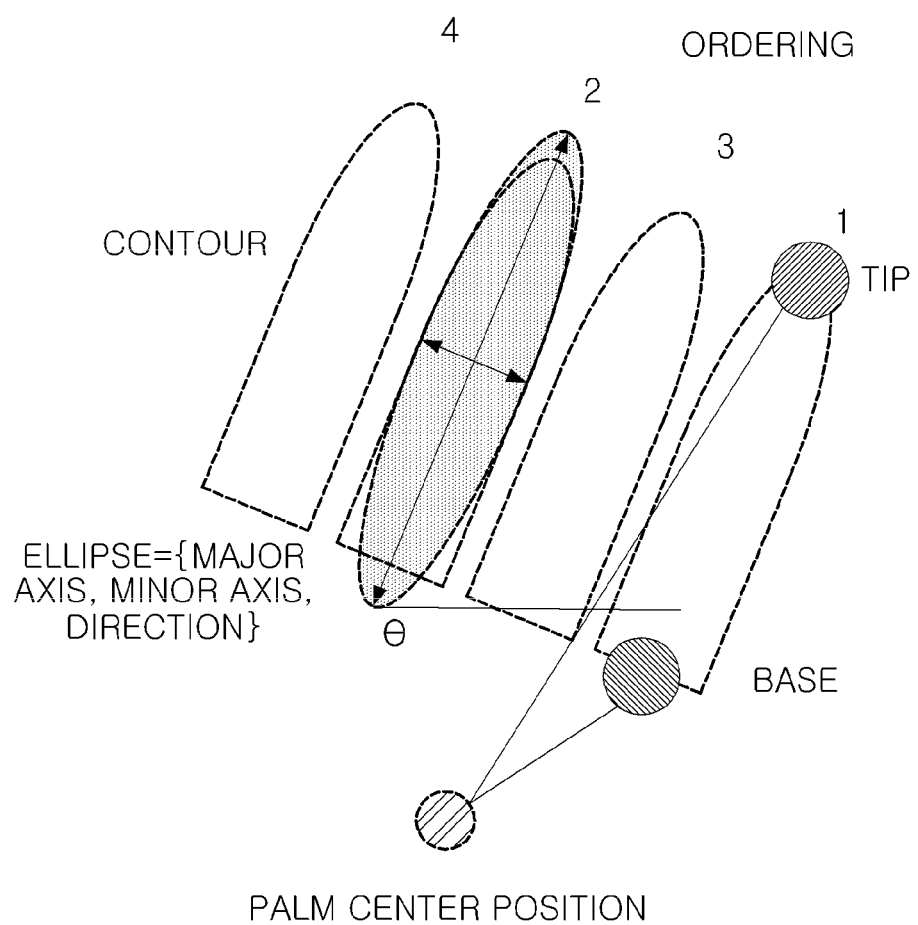
FIG. 5 illustrates an example of a visual feedback-related screen for depth recognition improvement with respect to the method of providing an augmented reality interaction service, according to an embodiment of the present invention.

Meanwhile, by using a process shown in FIG. 5, the base point of the finger is detected but the end point of the finger is not detected when the finger is bent towards the palm. This is because points of an ellipse fitting model do not include a fingertip in an image. In other words, when the finger is bent, a point of a finger joint at the end of the finger is detected instead of the fingertip. Accordingly, when inverse kinematics is applied, a large error is generated while estimating a parameter of a finger joint.

In this regard, according to an embodiment of the present invention, instead of detecting an end point of a hand by only using a fitted ellipse in 2D, the end point is detected by using depth information. Accordingly, in the present invention, an end point is detected by using zero-mean normalized cross correlation (ZNCC) well known in image processing fields.

Figure 6:
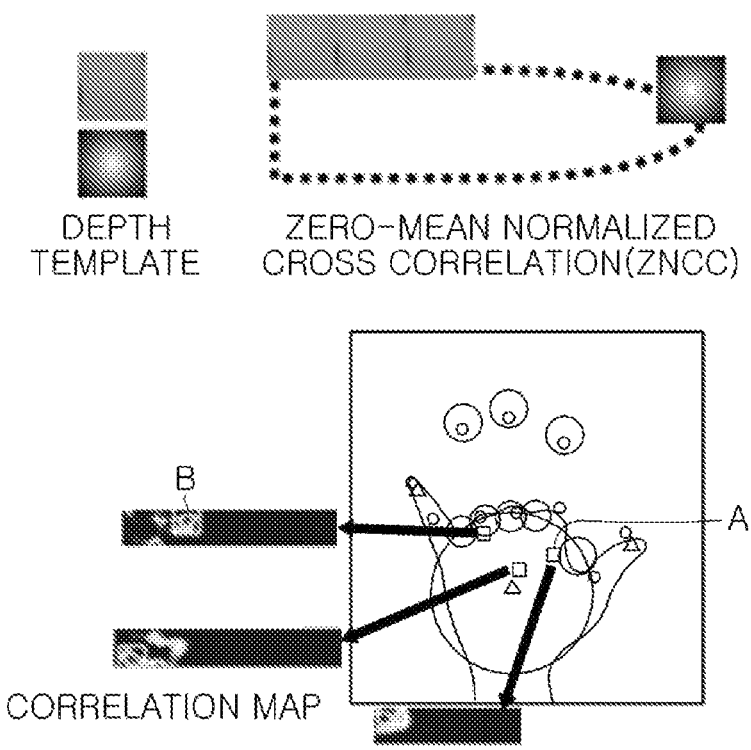
FIG. 6 illustrates an example of a semi-transparent gray shadow and guideline-related screen with respect to the method of providing an augmented reality interaction service, according to an embodiment of the present invention.

Here, as shown in FIG. 6, an end point (A) of a hand may be extracted from a pre-modeled depth template, by using template matching. B region in a correlation map in FIG. 6 is a region that is most similar to the depth template. In this case, the end point of the hand is detected even when the finger is bent. A location of the detected end point of the hand and a location of the base point of the finger are input to an inverse kinematics algorithm in a subsequent module.

Lastly, in operation 120, a posture of the sub-object is estimated based on joint information of the object provided through a certain user interface (UI) to control a 3D object for use of an augmented reality service.

In more detail, the inverse kinematics described above is used in the present invention to estimate a posture of the finger, wherein the inverse kinematics is used to estimate parameters of joints when the reference coordinates and the location of the end point are provided, and the base point obtained from the camera is assigned as an origin of the reference coordinates and the location of the fingertip is set as the end point.

Then, rotation matrixes of the joints are estimated by using the inverse kinematics. Since the number of parameters that move the finger is four, four parameters are estimated per finger.

Here, the inverse kinematics algorithm is an inverse kinematics algorithm based on a damped least-square-method.

Such an algorithm is used to estimate an amount of each joint to be changed by using a difference between a target point (a location of a fingertip obtained from a camera) and a current point (a location of a fingertip of a current model).

Figure 7:
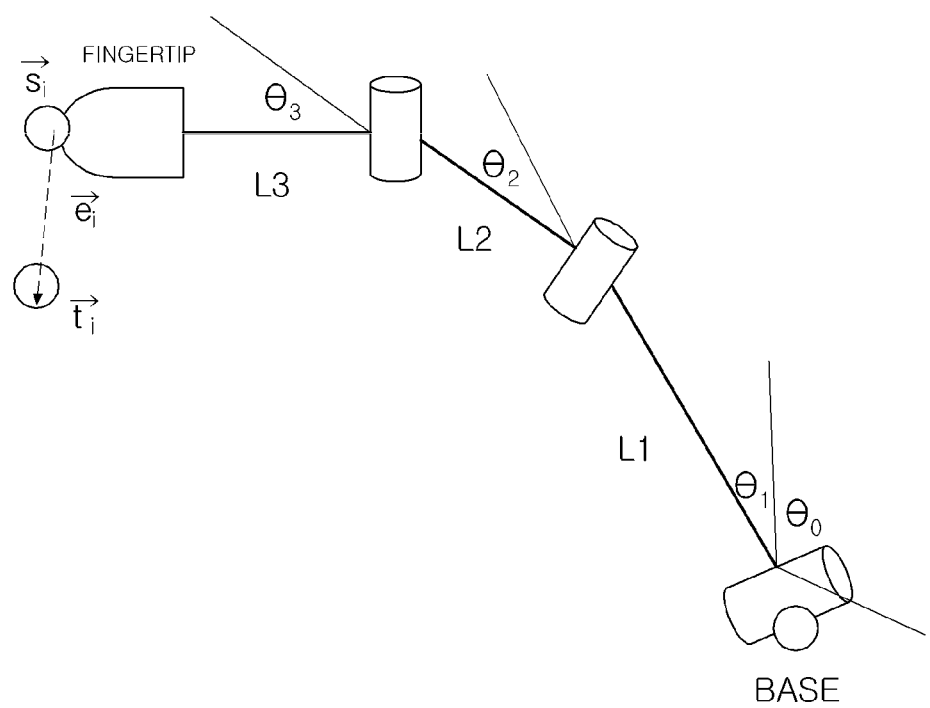
FIG. 7 illustrates an example related to a finger joint-related location vector with respect to the method of providing an augmented reality interaction service, according to an embodiment of the present invention.

Referring to FIG. 7, as shown in FIG. 7, $\theta$ is a location vector of an end point of a current finger and $\lambda$ is a location vector of an end point of a finger obtained through an image process (origins of reference coordinates of the two vectors are base points of the finger). $\theta$ denotes a parameter of a rotation matrix of a finger joint and $\lambda$ denotes a damping ratio parameter. L1, L2, and L3 each denote a length of a finger joint. An optimization problem of the inverse kinematics algorithm may be defined according to Equation 2 below, and for example, may be set to 1,000 such that that this parameter is high, stability of the inverse kinematics algorithm is high.

$$\Delta\theta^* = \operatorname{argmin}(\|J\Delta\theta - \vec{e}\|^2 + \lambda^2 \|\Delta\theta\|^2) \quad \text{[Equation 2]}$$

Then, the 3D object is manipulated through operation 120. Manipulation of a virtual object according to the present invention is performed according to a posture of a finger widely used by a user. Here, a targeted posture of a finger is a posture mapped from the number of fingers.

Figure 8:
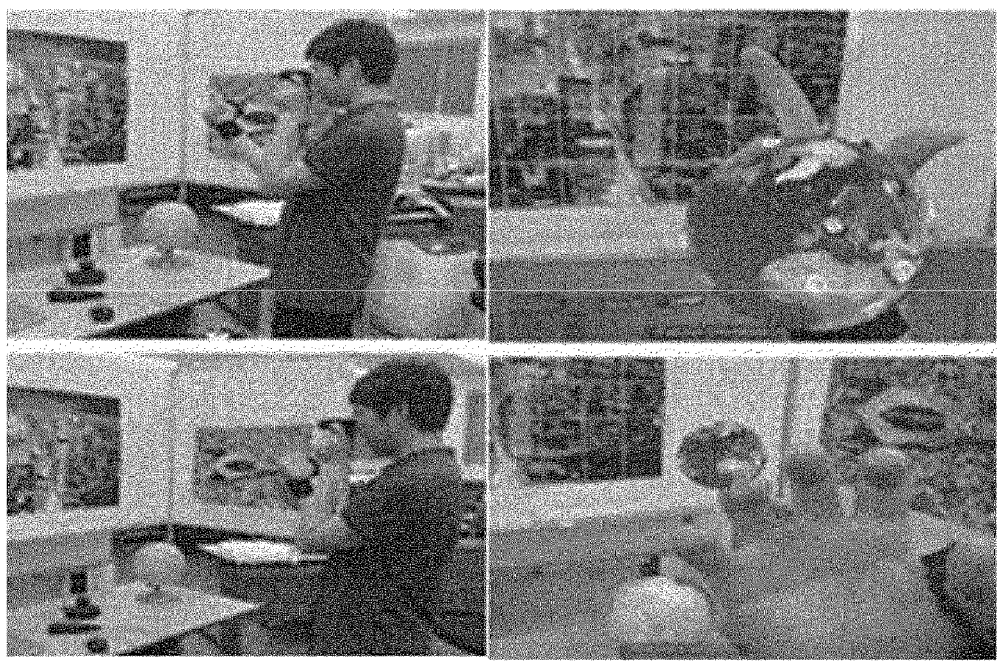
FIG. 8 illustrates examples related to a whole operation to which a visual distance recognition improvement method of a user is applied with respect to the method of providing an augmented reality interaction service, according to an embodiment of the present invention.

As shown in FIG. 8, pinching fingers determine a location of a globe. Then, by closing and opening the hand, a size of the globe is manipulated. According to such interaction, a user wearing an RGB-D camera-attached HMD may adjust a location and size of a virtual globe that is an augmented virtual object, thereby obtaining virtual digital information.

Figure 4:
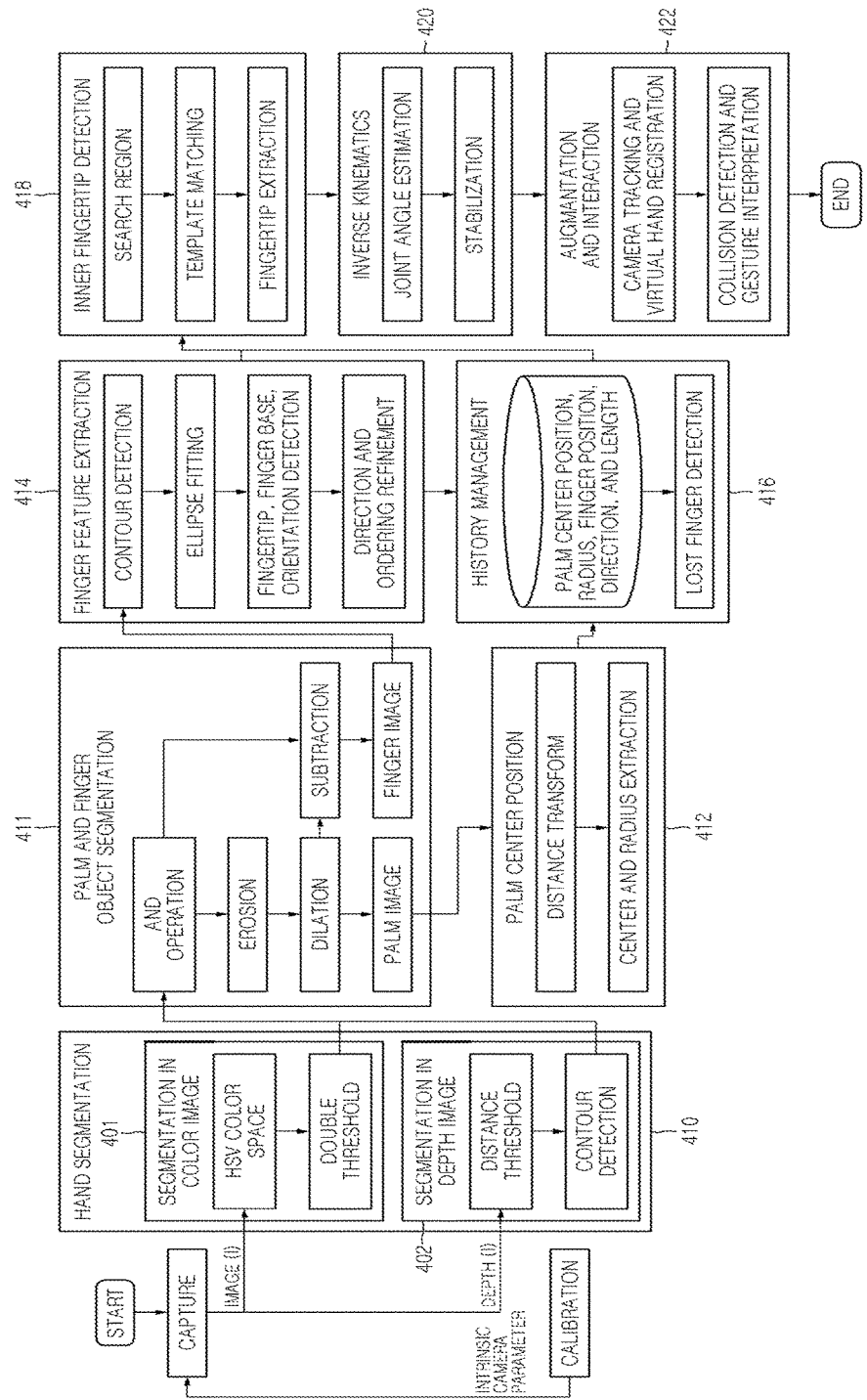
FIG. 4 is a detailed block diagram of an operation algorithm of estimating a posture of a hand with respect to the method of providing an augmented reality interaction service, according to an embodiment.

An operation algorithm of estimating the posture of the hand with respect to the method providing the augmented reality interaction service, according to an embodiment of the present invention, may be blocked as shown in FIG. 4. Referring to FIG. 4, in more detail, block by block operations of FIG. 4 are as follows.

Hand Segmentation 410

A hand object is segmented from an RGB image and a depth image (operations 401 and 402).

First, an RGB color space is converted to an HSV color space for satisfactory skin region segmentation with respect to an effect of light in operation 401. A skin color space may be obtained by performing a double threshold on s and v components.

In operation 402, a distance as much as a distance (arm length) from a hand to a camera attached to an HMD is set as a threshold, and a contour is detected.

A region of a hand is easily and satisfactorily segmented from an intersection of results of depth segmentation and RGB segmentation in operations 401 and 402.

Palm and Finger Modeling 411 and 412

A palm and a finger are segmented so as to estimate a posture of the finger, from the segmented image of the hand. Here, the image of the hand is segmented into the finger and the palm (a palm image and a finger image) by performing a morphological operation (erosion and dilation), and in addition, by interworking subtraction to the dilation.

Distance transform, and center and radius extraction are performed on the palm image for a palm center position operation.

Finger Feature Extraction 414

Contour detection from the finger image,

Ellipse fitting, and

Direction and ordering refinement through fingertip, finger base, and orientation detection History Management 416

Palm center position, radius, finger position, direction, and length

Lost finger detection

Inner Fingertip Detection 418

Search region, template matching, and fingertip extraction

Inverse Kinematics 420

Joint angle estimation and stabilization

Augmentation and Interaction 422

Camera tracking and virtual hand registration, and

Collision detection and gesture interpretation

Meanwhile, in the method of providing the augmented reality interaction service, according to an embodiment of the present invention, a position of coordinates is automatically calibrated through geometric recognition-based matching coordinates calibration while authoring augmented reality content, as will be described in detail with reference to FIG. 3.

Figure 3:
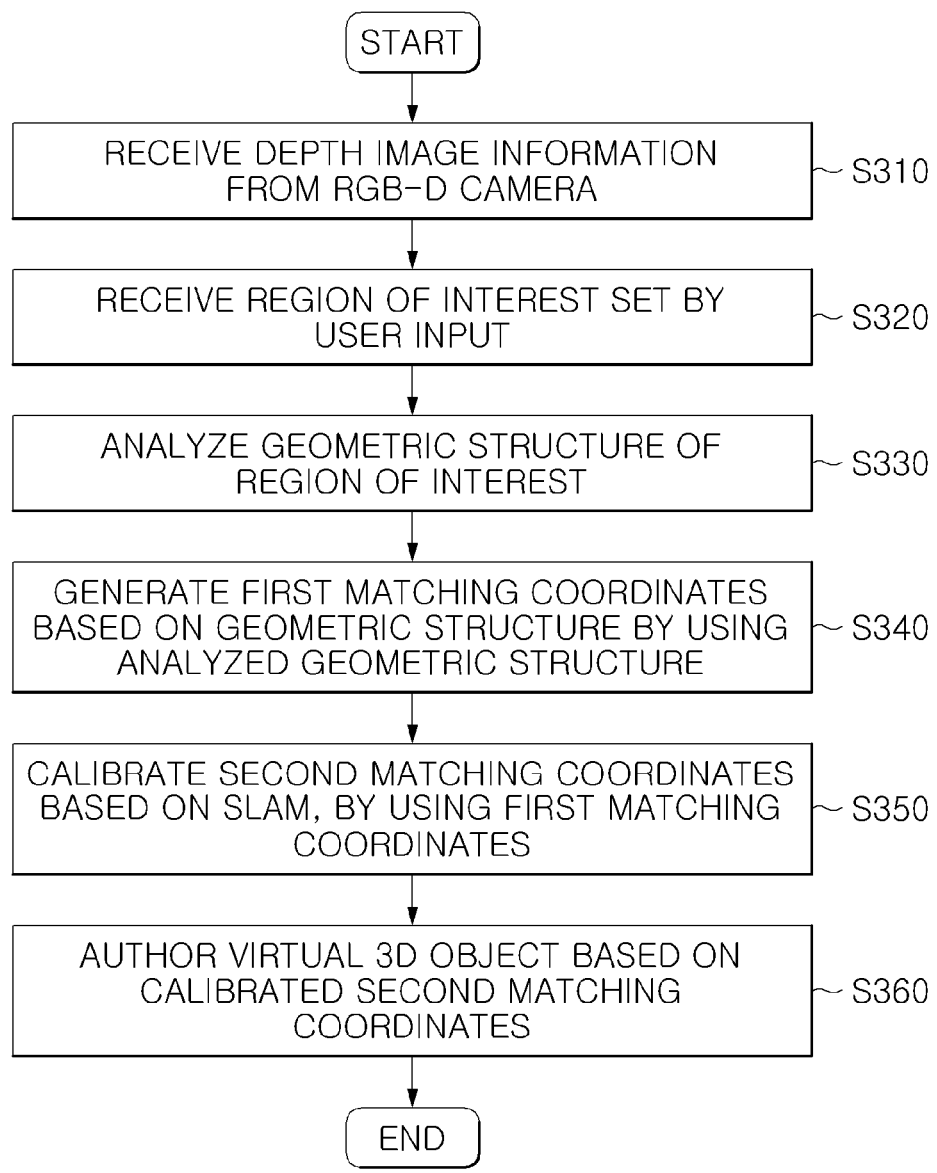
FIG. 3 is a flowchart of a method of calibrating matching coordinates with respect to the method of providing an augmented reality interaction service, according to an embodiment of the present invention.

FIG. 3 is a flowchart of a method of calibrating geometric recognition-based matching coordinates with respect to the method of providing the augmented reality interaction service, according to an embodiment of the present invention.

Referring to FIG. 3, depth image information is received from a depth camera, for example, an RGB-D camera, and a region of interest set by a user input is received, in operations S310 and S320.

Here, the depth image information is information obtained and generated by the depth camera, and may include a characteristic of a captured image, position information of a camera, a distance map image according to depth information, and color. The region of interest may be received after being set by the user input using a mobile input device.

When the region of interest is received, a geometric structure of the region of interest is analyzed by using the received depth image information, and first matching coordinates based on a geometric structure are generated by using the analyzed geometric structure, in operations S330 and S340).

Here, in operation S330, a geometric structure analysis of predicting a plane, a tangent line, a tangent surface, and an intersection point of the region of interest received from the depth camera may be performed, and in operation S340, matching coordinates of a real space may be generated through a geometric structure analysis of the real space or region of interest. Here, 1) at least one of the plane, the tangent line, the tangent surface, and the intersection point of the region of interest may be predicted through the geometric structure analysis of the region of interest, and the first matching coordinates may be generated through the predicted at least one of the plane, the tangent line, the tangent surface, and the intersection point, or 2) an origin and a direction may be calculated through the geometric structure analysis of the region of interest, any one of a front surface, a side surface, and a bottom of a predicted plane may be defined in consideration of a relationship with a position of the depth camera, and a calculated direction sign may be calibrated to match pre-determined left coordinates of a virtual space to generate the first matching coordinates.

When the first matching coordinates based on the geometric structure are generated, second matching coordinates based on SLAM may be calibrated by using the generated first matching coordinates, and then a virtual 3D object may be authored based on the calibrated second matching coordinates (operations S350 and S360).

Here, in operation S350, the second matching coordinates may be calibrated based on an actual survey by calculating a ratio of a distance of an SLAM-based camera and a distance of the depth camera generating the depth image information.

This will be described with reference to FIGS. 4 through 8, and generating of matching coordinates through a depth-based geometric analysis and calibrating of an SLAM-based initial matching coordinates will be described.

First, the generating of the matching coordinates through the depth-based geometric analysis will be described.

Figure 10:
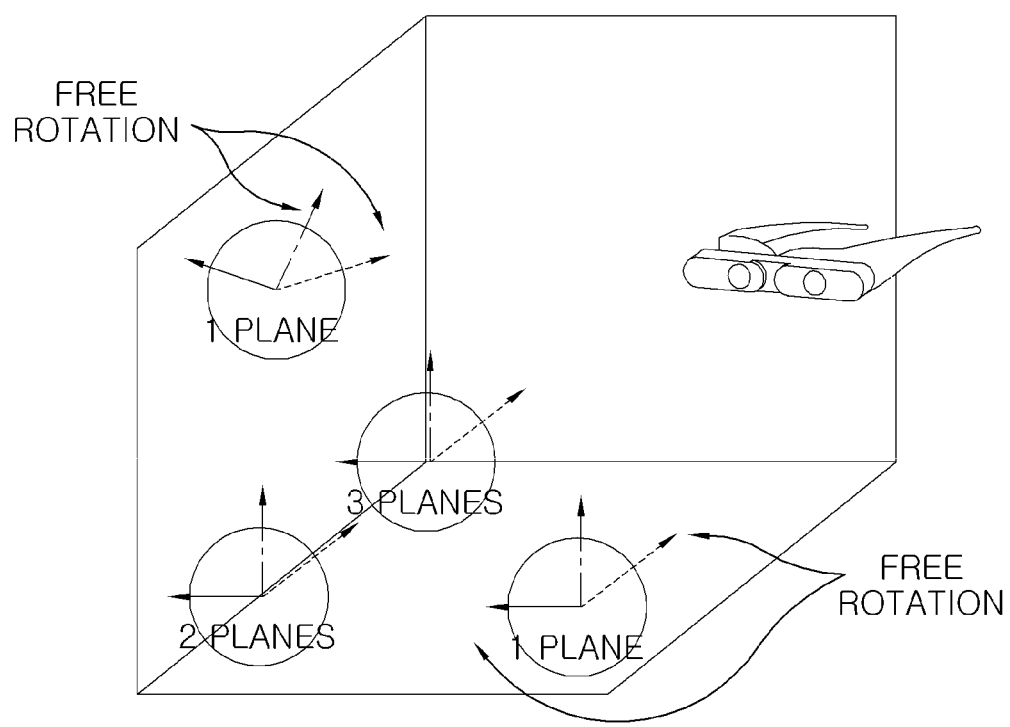
FIG. 10 illustrates an example of candidates of matching coordinates in a 3-dimensional (3D) space with respect to the method of providing an augmented reality interaction service, according to an embodiment of the present invention.

According to an example of generating a new local coordinate by using depth information, an origin location and a direction are calculated in order to prepare a matching coordinate under a condition of various shapes having a 1 plane, 2 planes, and 3 planes as shown in FIG. 10.

As an interactive method, a user determines a center location of a region of interest (ROI) from an RGB-D camera by using a mobile input device. A radius circular cursor of 50 pixels, which determines a region of a depth map image based on the determined center location of the ROI, is controlled. A 3D point cloud is reconstructed in a depth map, and local reference coordinates, i.e., first matching coordinates are generated.

In order to set a position of the local reference coordinates, planes are estimated from the 3D point cloud of the ROI.

Here, as represented by Equation 3 below, plane estimation may be defined as an optimization problem of predicting variables a, b, c, and d of a normal vector forming a plane equation, the variables may be estimated by using a random sample consensus (RANSAC) algorithm.

$$\pi^* = \mathrm{argmin}_{a,b,c,d} \left[ \sum_{i=1}^{N} \frac{|av_{i,x} + bv_{i,y} + cv_{i,z} + d|}{\sqrt{a^2 + b^2 + c^2}} \right], \quad \text{[Equation 3]}$$

$$v_i \in RoI$$

1) When there is a first plane, a 3D coordinate obtained by back-projecting a 2D cursor point of a depth map is set as a position of a local reference coordinate. However, since there is no information about a cross line or a corner, information for determining 3 degree of freedom rotation is not sufficient. Accordingly, only 1 degree of freedom rotation of coordinates is set from a normal vector $n_{plane}$ of a plane (a wall or a bottom). Rotation other than a vector is set by assigning an X-axis direction vector ($V_{camera's\ x\ axis}$) of a camera to an X-axis direction vector of local reference coordinates. Also, a rotation parameter ($V_{unknown\ rotation}$) that is unknown may be set through a normal vector and X-axis outer product, as represented in Equation 4.

$$V_{unknown\ rotation} = n_{plane} \times V_{camera's\ x\ axis} \quad \text{[Equation 4]}$$

2) When two planes cross each other, a method of determining a 3 degree of freedom location in a local reference coordinate is performed by calculating a 3D coordinate on a cross line close to a point ($v_o$) selected by a user in a selection region of the user. As represented in Equation 5 below, a point ($v^*$) that minimizes a distance between the $v_o$ and a $v_i$, i.e., a point of a 3D point cloud, as a reference location of coordinates.

$$v^* = \mathrm{argmin}_{v_i}[\|v_i - v_o\|^2 + \lambda(v_i - v_1) \cdot n_1 + \mu(v_i - v_2) \cdot n_2] \quad \text{[Equation 5]}$$

Here, the sum of two plane equations is minimized, wherein $v_1$ and $v_2$ are points respectively in planes $\pi_1$ and $\pi_2$, and the sum may be minimized if $v_i$ is on the cross line.

Such an equation is induced by expansion of Lagrange Multipliers, and a matrix value thereof is calculated via QR decomposition. Rotation of the coordinates is used to determine, from predicted planes, two normal vectors, for example, vertical and ground surfaces are used to determine a direction of coordinates, for example, a vertical and bottom planes. A direction vector of the cross line may be set by an outer product of a normal vector, and may be represented as Equation 6 below.

$$n_3 = n_1 \times n_2 \quad \text{[Equation 6]}$$

3) When 3 planes cross each other, a location of an origin of coordinates is an intersection point of the 3 planes. An equation $\pi v=d$ is set. Here, n denotes a matrix including coefficients of a plane, and as shown in Equation 7, a value of $\pi v-d$ may be minimized to be set as a reference location of coordinates.

$$v^* = \operatorname{argmin}_{v_i} \left\| \begin{bmatrix} a_1 & b_1 & c_1 \\ a_2 & b_3 & c_2 \\ a_3 & b_3 & c_3 \end{bmatrix} \begin{bmatrix} v_{i,x} \\ v_{i,y} \\ v_{i,z} \end{bmatrix} - \begin{bmatrix} d_1 \\ d_2 \\ d_3 \end{bmatrix} \right\|^2 \quad \text{[Equation 7]}$$

Here, an SVD decomposition-based least square solution, i.e., an optimization technique, may be used to calculate an intersection point from an pseudo matrix, and rotation may be set through a normal vector of the 3 planes.

In estimation rotation of a previous operation, directions of x-, y-, and z-axes are not accurate because an order and sign of predicted normal vectors may change, but in the present invention, an order of normal vectors complies with the number of point clouds. This is important in graphic rendering in a left or right hand-based rendering system.

Accordingly, as a follow-up process, rotation of coordinates is aligned in consideration of rotation information of an RGB-D camera. Angle differences between normal vectors of a plane and direction vectors (a front vector, a side vector, and a maximum vector) of a camera are calculated through an outer product, and then a normal vector having a minimum angle difference with respect to a direction vector of the camera is found. The normal vector determines the direction vector of the camera and, for example, when $i^{th}$ normal vector ($N_i$) has a minimum angle difference with a front direction camera vector ($C_{Front}$), $N_i$ may be set to a z-axis. As such, other normal vectors may be defined to x- and y-axes, and a direction signal of a coordinate may be calibrated. In other words, a direction vector of a camera may be determined according to Equation 8 below.

$$\begin{cases} z \text{ axis} = \operatorname{argmin}_i Dot\|N_i, C_{Front}\| \\ x \text{ axis} = \operatorname{argmin}_i Dot\|N_i, C_{side}\| \\ y \text{ axis} = \operatorname{argmin}_i Dot\|N_i, C_{Ground}\| \end{cases} \quad \text{[Equation 8]}$$

Here, $C_{Side}$ and $C_{Ground}$ denote a side direction camera vector and a bottom direction camera vector.

Figure 11:
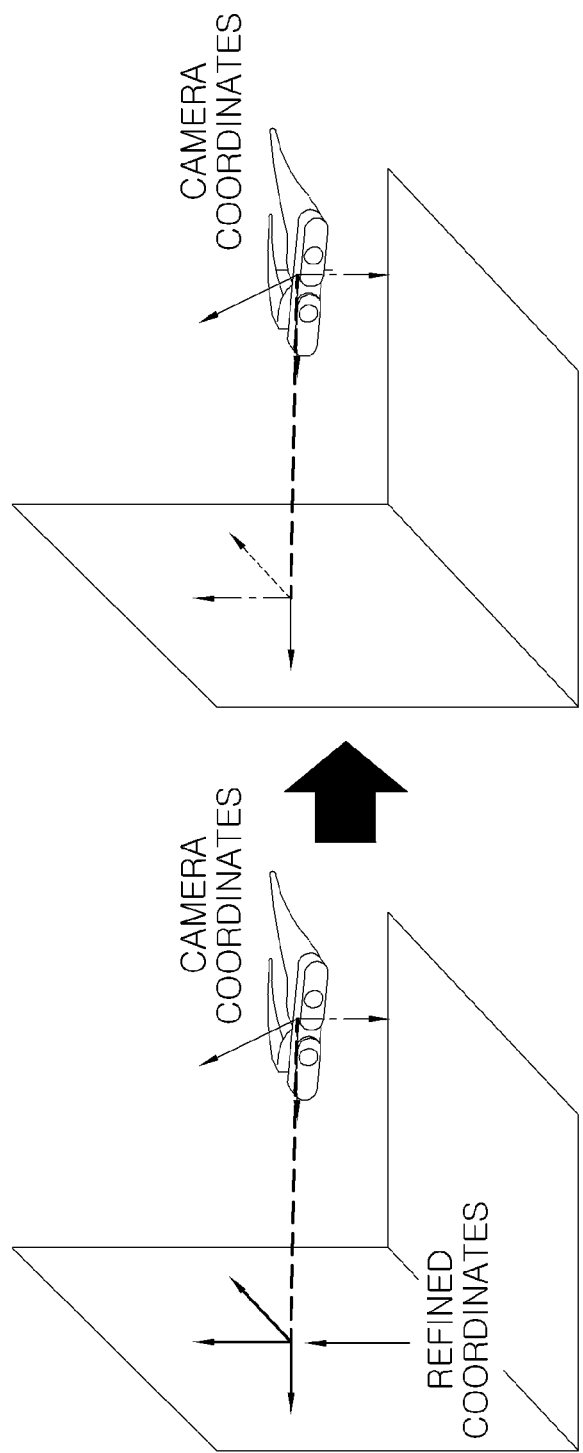
FIG. 11 illustrates an example of a setting of a rotation axis of matching coordinates with respect to the method of providing an augmented reality interaction service, according to an embodiment of the present invention.

According to such operations, a rotation axis of matching coordinates may be set as shown in FIG. 11.

Next, the calibrating of the SLAM-based initial matching coordinates will now be described.

As described above, in order to align an SLAM-based initial local reference coordinate to depth camera coordinates-based local reference coordinates, a scale should be considered, and a size of a virtual model may be arbitrarily determined during SLAM initialization.

Accordingly, in order to convert a scale of SLAM-based coordinates to a scale unit of a real space, a distance from an origin coordinate of the SLAM-based coordinates to an RGB camera is calculated. This is a location vector size of a position matrix of the GB camera, and may be expressed in a virtual scale unit.

Then, a depth length from a depth camera is calculated, wherein the depth length is a value of a depth map and may be expressed in a meter scale unit.

Lastly, a scale ratio ($\lambda$) is calculated as represented in Equation 7, and through such processes, a scale unit of a real world may be applied to augment a virtual object in an SLAM-based virtual real space as represented in Equation 8.

Accordingly, in the present invention, passive scale calibration is not required, and scale calibration is automatically performed.

$$\lambda = \frac{\text{Camera distance in virtual scale}}{\text{Camera distance in real scale(meter unit)}} \quad \text{[Equation 9]}$$

$$s_{new} = \lambda s \quad \text{[Equation 10]}$$

Figure 12:
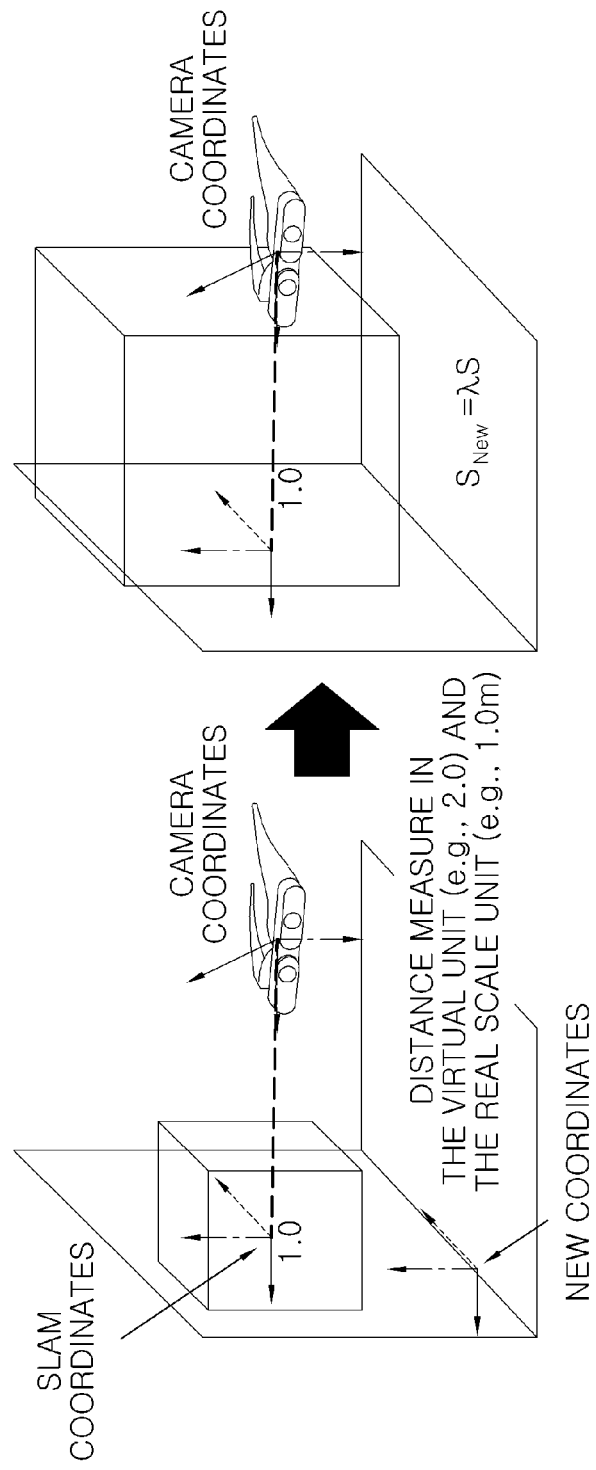
FIG. 12 illustrates an example of scale calibration using a distance ratio between simultaneous localization and mapping (SLAM)-based matching coordinates and depth camera-based matching coordinates with respect to the method of providing an augmented reality interaction service, according to an embodiment of the present invention.

In other words, as shown in FIG. 12, a scale of SLAM coordinates is calibrated in consideration of a ratio between the scale of the SLAM coordinates and a scale in the real world.

Figure 13:
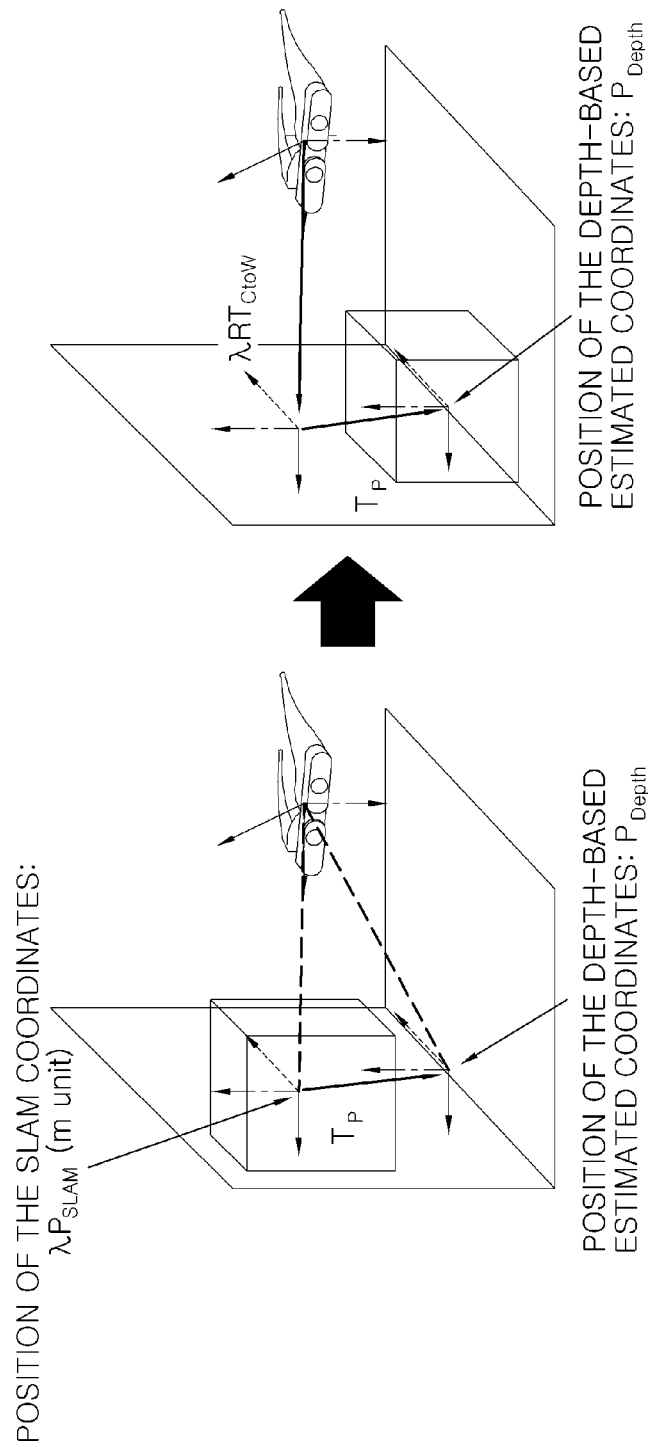
FIG. 13 illustrates an example of position correction with respect to the method of providing an augmented reality interaction service, according to an embodiment of the present invention.

After calibrating the scale, a position ($\lambda P_{SLAM}$) of the SLAM-based initial local reference coordinates is calculated in units of mm, and an offset transition matrix ($T_P$) is calculated in order to convert the position of the SLAM-based coordinates to a new position ($P_{Depth}$) obtained through a depth-based geometric structure analysis. The offset transition matrix may be calculated according to Equation 11 below, wherein the offset transition matrix $T_P$ may be used to move $RT_{CtoW}$ to $RT_{Refine\_trans}$, as shown in FIG. 13, and an equation regarding position correction may be represented by Equation 12 below.

$$T_P = P_{Depth} - \lambda P_{SLAM} \quad \text{[Equation 11]}$$

$$RT_{Refine\_trans} = \lambda T_P RT_{CtoW} \quad \text{[Equation 12]}$$

Here, $RT_{CtoW}$ denotes a matrix that converts camera coordinates to virtual space coordinates in an SLAM-based virtual space, and $RT_{Refine\_trans}$ denotes a calibrated local reference coordinates.

Accordingly, a virtual object may be augmented based on coordinates aligned in a real space scale.

Figure 14:
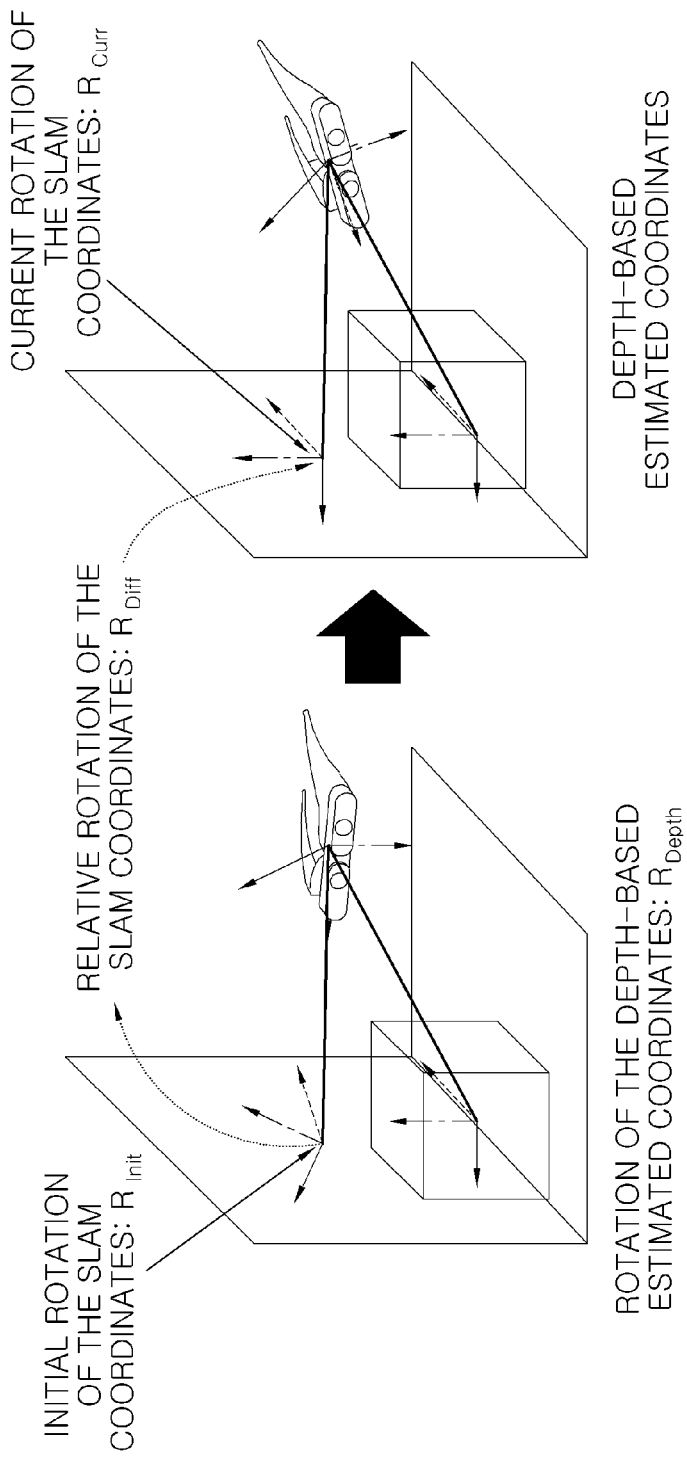
FIG. 14 illustrates an example of rotation correction with respect to the method of providing an augmented reality interaction service, according to an embodiment of the present invention.

Also, as shown in FIG. 14, rotation correction may be performed, and in this regard, a difference matrix ($R_{Diff}$) of a rotation ($R_{Curr}$) of current local coordinates with respect to rotation ($R_{Init}$) of initial local coordinates is calculated as represented in Equation 13 below. The difference matrix ($R_{Diff}$) calculated as such may be reflected to calibrate $RT_{Refine\_trans}$, as reflected in Equation 13 below.

$$R_{Diff} = (R_{Init} * R_{Curr}^{-1}) \quad \text{[Equation 13]}$$

$$RT_{Final} = R_{Diff} R_{Depth} R_{Curr}^{-1} RT_{Refine\_trans} \quad \text{[Equation 14]}$$

As shown in Equation 14, as a method of calibrating $RT_{Refine\_trans}$, $R^{-1}_{Curr}$ is multiplied to $RT_{Refine\_trans}$, so as to offset current camera rotation, and $R_{Depth}$ from depth estimation coordinates is multiplied so as to calibrate rotation by reflecting geometric information. Also, the difference matrix ($R_{Diff}$) is multiplied so as to reflect camera rotation tracking information relative to initial camera rotation, thereby performing rotation correction.

As such, according to the present invention, in order to author a wearable augmented reality, an arbitrary space that is not pre-modeled may be modeled in real time by using an RGB-D camera and a geometric structure may be analyzed to automatically generate matching coordinates based on an actual survey, and accordingly, a user may easily and precisely author an augmented reality without additional operation of calibrating the matching coordinates.

Hereinabove, the method of providing an augmented reality interaction service, according to an embodiment of the present invention, has been described.

Hereinafter, an apparatus for providing an augmented reality interaction service, according to an embodiment of the present invention, will be described with reference to FIGS. 15 and 16.

Figure 15:
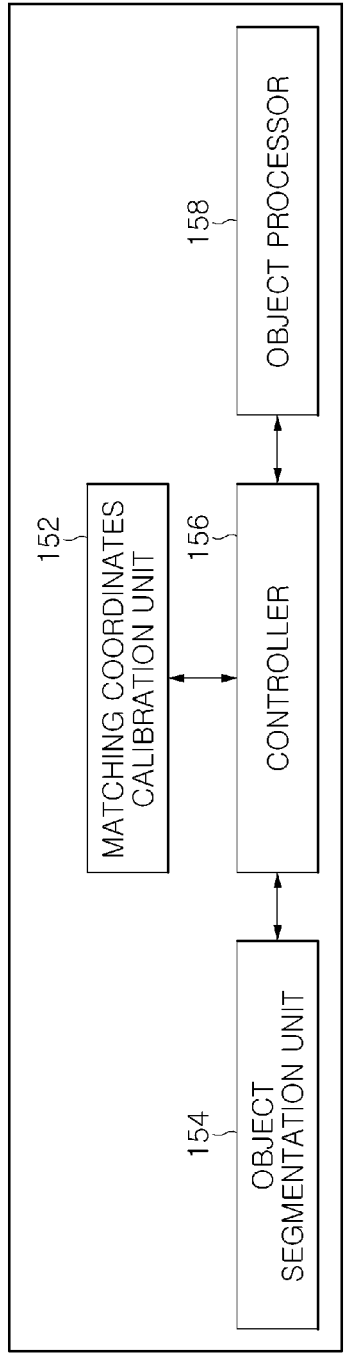
FIG. 15 is a block diagram of an apparatus for providing an augmented reality interaction service, according to an embodiment of the present invention.

FIG. 15 is a block diagram of an apparatus for providing an augmented reality interaction service, according to an embodiment of the present invention.

Referring to FIG. 15, the apparatus includes a matching coordinates calibration unit 152, an object segmentation unit 154, a controller 156, and an object processor 158.

The matching coordinates calibration unit 152 generates reference coordinates based on a 3D image including depth information obtained through a camera.

The object segmentation unit 154 segments a region corresponding to a pre-set object from the 3D image including the depth information obtained through the camera based on depth information and color space conversion of the pre-set object under control of the controller 156.

Here, the object segmentation unit 154 may convert an RGB color space of a hand image region corresponding to the pre-set object in an RGB image to an HSV color space and perform segmentation on the region corresponding to the pre-set object based on a skin color space obtained by performing a double threshold with respect to saturation and value in the HSV color space.

Also, the object segmentation unit 154 may set, as a threshold, a distance from a depth image to a distance between a hand and a camera, and segments a region of the hand based on an intersection corresponding to results of depth segmentation and RGB segmentation obtained from each image.

The object processor 158 segments a sub-object having a motion component from the object in the region segmented by the object segmentation unit 154, under control of the controller 156, and detects a feature point by modeling the segmented sub-object and a palm region linked to the sub-object based on a pre-set algorithm.

Also, the object processor 158 models the palm region by segmenting a finger and a palm corresponding to the palm region linked to the sub-object by using a morphological operation, so as to estimate a posture of the finger corresponding to the sub-object from the hand image corresponding to the object.

The controller 156 controls overall operations of the apparatus 150 for providing an augmented reality interaction service, and controls a 3D object for use of an augmented reality service by estimating the posture of the sub-object based on frame information of the object, which is provided through a certain UI.

Figure 16:
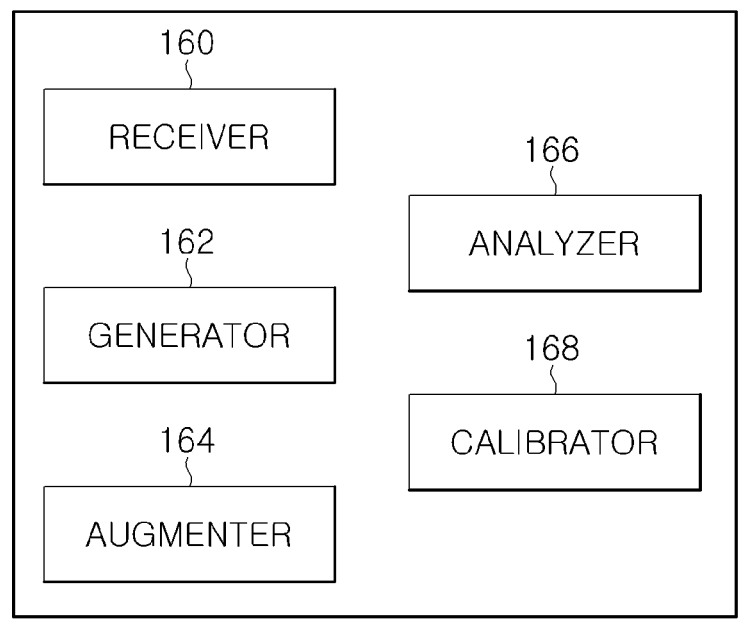
FIG. 16 is a block diagram of a matching coordinates calibration unit included in the apparatus for providing an augmented reality interaction service, according to an embodiment of the present invention.

Meanwhile, the matching coordinates calibration unit includes, as shown in FIG. 16, a receiver 160, a generator 162, an augmenter 164, an analyzer 166, and a calibrator 168.

The receiver 160 receives depth image information from a depth camera or receives information set or input by a user input.

Here, the receiver 160 may receive the depth image information from a depth camera, for example, an RGB-D camera, attached to an apparatus worn by a user, for example, a glasses type display device, such as a head-worn display (HWD) worn on a head of the user, and may receive an ROI in a real space set through a user input. Here, the ROI may be set according to a user input using a mobile input device.

The depth image information in the present invention is information obtained and generated by the depth camera, and may include a characteristic of a captured image, position information of a camera, a distance map image by depth information, and color.

The analyzer 166 analyzes a geometric structure of the real space or ROI by using the depth image information received by the receiver 160.

Here, the analyzer 166 may perform an geometric structure analysis of predicting a plane, a tangent line, a tangent surface, and an intersection point of the ROI received from the depth camera.

The generator 162 generates matching coordinates of the real space through the geometric structure analysis of the real space or the ROI, which is performed by the analyzer 166.

Here, the generator 162 may predict at least one of the plane, the tangent line, the tangent surface, and the intersection point of the ROI through the geometric structure analysis of the ROI, and generate first matching coordinates through the predicted at least one of the plane, the tangent line, the tangent surface, and the intersection point.

Here, the generator 162 may calculate an origin and a direction through the geometric structure analysis of the ROI, define any one of a front surface, a side surface, and a bottom of a plane predicted in consideration of a relationship with a position of the depth camera, and generate the first matching coordinates by calibrating a calculated direction sign to match pre-determined left coordinates in a virtual space.

The calibrator 168 calibrates pre-generated matching coordinates, for example, second matching coordinates, based on an actual survey so as to match the virtual space, by using matching coordinates of the real space or ROI, which are generated by the generator 162.

Here, the second matching coordinates may be matching coordinates generated from an SLAM algorithm, and the calibrator 168 may calibrate the second matching coordinates based on the actual survey, by using a ratio of a distance of an SLAM-based camera and a distance of the depth camera generating the depth image information.

The augmenter 164 is a component configured to augment a virtual object based on the calibrated matching coordinates, and augments a virtual object and arranges the augmented virtual object in a space.

Here, the augmenter 164 may arrange the virtual object in the space by using a user input received through the mobile input device.

Figure 9A:
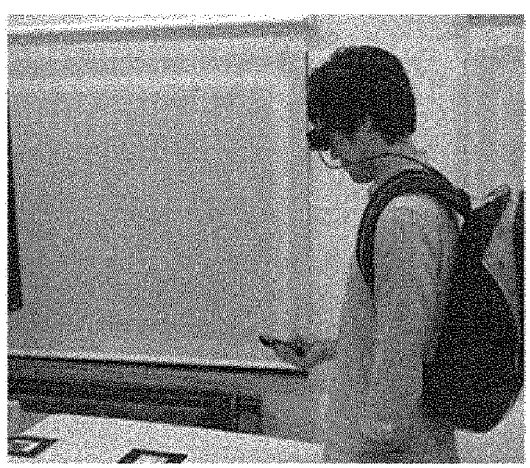
FIG. 9A to 9D are diagrams related to matching coordinates calibration with respect to the method of providing an augmented reality interaction service, according to an embodiment of the present invention.
Figure 9B:
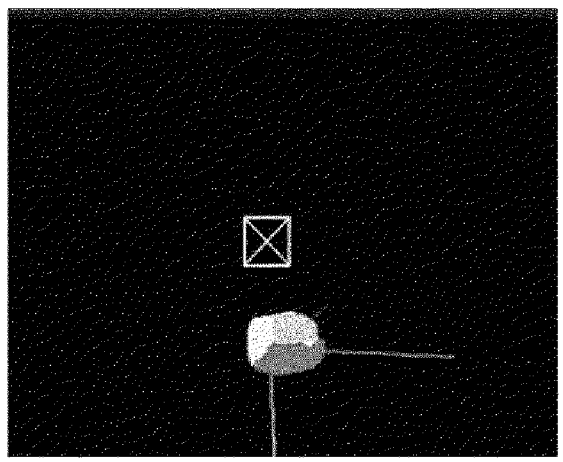

An apparatus according to an embodiment obtains depth image information by using an RGB-D camera shown in FIG. 9A, and selects a 3D point cloud when a user points a location of coordinates by using a mobile input device via an interactive method. Also, as shown in FIG. 9B, the apparatus performs a geometric analysis on a region, i.e., an ROI, selected by the user from a distance map image included in the depth image information as shown in FIG. 9B, and predicts a plane, a tangent line, a tangent surface, and an intersection point to generate matching coordinates for an augmented reality space in a plane form.

In detail, when 1, 2, or 3 planes are predicted in a space, an origin and a direction are calculated by predicting an intersection point, a tangent line, etc. via a pre-determined optimization method. Then, it is determined whether the plane is a front surface, a side surface, or a bottom in consideration of a relationship with a position of a camera, for example, a front position, a side position, or an upward position, and a direction sign is calibrated to match left coordinates in a virtual space.

Figure 9C:
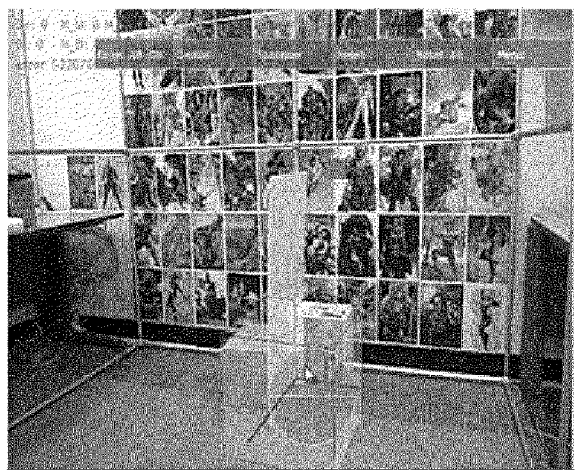

Then, as shown in FIG. 9C, initial matching coordinates, i.e., the second matching coordinates, generated based on an SLAM algorithm are calibrated to the matching coordinates calculated above, and then a virtual object is augmented in a real space by obtaining a position of the camera. Here, in order to calibrate a virtual scale of the coordinates generated based on SLAM to a scale of the real space, a ratio of a distance of an SLAM-based camera based on the initial matching coordinates and a distance of a depth camera is calculated in a distance unit, for example, m.

Figure 9D:

As such, when the ratio is applied to augment the virtual object, the virtual object may be augmented based on the matching coordinates by reflecting a unit scale of the real space as shown in FIG. 9D. For example, the user may arrange the virtual object in the space by using the mobile input device, based on the calibrated coordinates.

Here, it is obvious that such details are used to perform a method according to the present invention is applied, and the method according to the present invention may also be used in the apparatus according to the present invention.

Although preferred embodiments of the present invention have been described for illustrative purposes, those skilled in the art will appreciate that various modifications, additions and substitutions are possible, without departing from the scope and spirit of the invention as disclosed in the accompanying claims. Therefore, the embodiments of the present invention are disclosed only for illustrative purposes and should not be construed as limiting the present invention.

The invention claimed is:

1. A method of providing an augmented reality interaction service, the method comprising:
generating reference coordinates based on a 3-dimensional (3D) image comprising depth information obtained through a camera;
segmenting a region corresponding to a pre-set object from the 3D image comprising the depth information obtained through the camera, based on depth information of the pre-set object and color space conversion;
segmenting a sub-object having a motion component from the pre-set object in the segmented region, and detecting a feature point by modeling the sub-object and a palm region linked to the sub-object based on a pre-set algorithm; and
controlling a 3D object for use of an augmented reality service by estimating a posture of the sub-object based on joint information of the pre-set object provided through a certain user interface (UI),
wherein the palm region linked to the sub-object is molded by segmenting a finger and a palm corresponding to the palm region by using a morphological operation so as to estimate postures of the finger corresponding to the sub-object from a hand image corresponding to the pre-set object,
wherein a center of the palm is calculated through distance transform, and
wherein the finger is modeled via ellipse fitting, based on an equation below to estimate, as a base point, a minimum distance from among distances between points of a modeled ellipse and the calculated center of the palm:

$$\text{base point}(x,y,z) = \min(|\overline{\text{finger}(x,y,z)} - \overline{\text{centerofpalm}(x,y,z)}|).$$

2. The method of claim 1, wherein the segmenting of the region corresponding to the pre-set object is performed based on a skin color space obtained by converting an RGB color space of a hand image region in an RGB image, which corresponds to the pre-set object, to an HSV color space and performing a double threshold on the HSV color space with respect to saturation and value.

3. The method of claim 2, wherein a distance corresponding to a distance between a hand and the camera from a depth image is set as a threshold, and a region of the hand is segmented based on an intersection corresponding to results of a depth segmentation and an RGB segmentation obtained from each image, wherein the RGB segmentation includes the segmentation based on the skin color space derived from the RGB image.

4. The method of claim 1, wherein the generating of the reference coordinates comprises:
analyzing a geometric structure of a real space by using depth image information obtained with respect to the real space;
generating first matching coordinates of the real space by using the analyzed geometric structure; and
calibrating second matching coordinates pre-generated to match a virtual space, based on an actual survey by using the generated first matching coordinates of the real space.

5. The method of claim 1, wherein the feature point comprises a base point of a finger corresponding to the sub-object and an end point of a hand based on depth information, and
the end point of the hand is extracted from a pre-modeled depth template by using template matching.

6. The method of claim 1, wherein the estimating of the posture of the sub-object comprises estimating an amount to be changed by each of finger joints by using a difference between a target point corresponding to an end location of a hand corresponding to the pre-set object obtained from the camera and a current point corresponding to an end location of the hand, which is photographed with respect to a real space, wherein the estimating of the amount is performed through inverse kinematics for estimating parameters of finger joints corresponding to the sub-object based on the generated reference coordinates and a location of the end point.

7. The method of claim 4, wherein the analyzing of the geometric structure comprises analyzing the geometric structure of the real space by using the depth image information of the real space photographed by using a depth camera.

8. The method of claim 7, further comprising receiving a region of interest in the real space set through a user input,
wherein the analyzing of the geometric structure comprises analyzing a geometric structure of the region of interest by using the depth image information, and
the generating of the first matching coordinates comprises predicting at least one of a plane, a tangent line, a tangent surface, and an intersection point of the region of interest through the analyzing of the geometric structure of the region of interest and generating the first matching coordinates through at least one of the predicted plane, tangent line, tangent surface, and intersection point.

9. The method of claim 8, wherein the generating of the first matching coordinates comprises generating the first matching coordinates by calculating an origin and a direction through the analyzing of the geometric structure of the region of interest, defining any one of a front surface, a side surface, and a bottom of the predicted plane in consideration of a relationship with a position of the depth camera, and calibrating a sign of the calculated direction to match a pre-determined coordinates direction of the virtual space.

10. The method of claim 4, wherein the second matching coordinates are matching coordinates generated from a simultaneous localization and mapping (SLAM) algorithm, and the calibrating based on the actual survey comprises calibrating the second matching coordinates based on the actual survey by using a distance ratio between a distance of an SLAM-based camera and a distance of a depth camera generating the depth image information.

11. An apparatus for providing an augmented reality interaction service, the apparatus comprising:

a matching coordinates calibration unit configured to generate reference coordinates based on a 3-dimensional (3D) image comprising depth information obtained through a camera;

an object segmentation unit configured to segment a region corresponding to a pre-set object from the 3D image comprising the depth information obtained through the camera, based on depth information of the pre-set object and color space conversion;

an object processor configured to segment a sub-object having a motion component from the pre-set object in the segmented region, and detect a feature point by modeling the sub-object and a palm region linked to the sub-object based on a pre-set algorithm; and a controller configured to control a 3D object for use of an augmented reality service by estimating a posture of the sub-object based on joint information of the pre-set object provided through a certain user interface (UI), wherein the object processor models the palm region linked to the sub-object by segmenting a finger and a palms corresponding to the palm region by using, a morphological operation so as to estimate posture of the finger corresponding to the sub-object from a hand image corresponding to the pre-set object, wherein a center of the palm is calculated through distance transform, and wherein the finger is modeled via ellipse fitting based on an equation below to estimate, as a base point, a minimum distance from among distances between points of a modeled ellipse and the calculated center of the palm:

$$\text{base point }(x,y,z)=\min(|\overline{\overline{\text{finger}(x,y,z)-\text{centerofpalm}(x,y,z)}}|).$$

12. The apparatus of claim 11, wherein the object segmentation unit segments the region corresponding to the pre-set object based on a skin color space obtained by converting an RGB color space of a hand image region in an RGB image, which corresponds to the pre-set object, to an HSV color space and performing a double threshold on the HSV color space with respect to saturation and value.

13. The apparatus of claim 12, wherein the object segmentation unit sets a distance corresponding to a distance between a hand and the camera from a depth image as a threshold, and segments a region of the hand based on an intersection corresponding to results of a depth segmentation and an RGB segmentation obtained from each image, wherein the RGB segmentation includes the segmentation based on the skin color space derived from the RGB image.

14. The apparatus of claim 11, wherein the matching coordinates calibration unit comprises:

an analyzer configured to analyze a geometric structure of a real space by using depth image information obtained with respect to the real space;

a generator configured to generate first matching coordinates of the real space by using the analyzed geometric structure; and a calibration unit configured to calibrate second matching coordinates pre-generated to match a virtual space, based on an actual survey by using the generated first matching coordinates of the real space.

15. The apparatus of claim 11, wherein the controller estimates the posture of the sub-object by estimating an amount to be changed by each of finger joints by using a difference between a target point corresponding to an end location of a hand corresponding to the pre-set object obtained from the camera and a current point corresponding to an end location of the hand, which is photographed with respect to a real space, wherein the estimating of the amount is performed through inverse kinematics for estimating parameters of finger joints corresponding to the sub-object based on the generated reference coordinates and a location of the end point.

* * * * *

UNITED STATES PATENT AND TRADEMARK OFFICE
CERTIFICATE OF CORRECTION

PATENT NO. : 10,304,248 B2  
APPLICATION NO. : 15/322075  
DATED : May 28, 2019  
INVENTOR(S) : Woo et al.

Page 1 of 1

It is certified that error appears in the above-identified patent and that said Letters Patent is hereby corrected as shown below:

On the Title Page

Item (72) Inventor is corrected to read:  
-- Woon Tack Woo, Daejeon (KR);  
Tae Jin Ha, Daejeon (KR);  
Gabyong Park, Daejeon (KR) --.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*